United States Patent [19]

Kim

[11] Patent Number: 5,038,237
[45] Date of Patent: Aug. 6, 1991

[54] POWER TRANSMISSION AND CLUTCH MECHANISM FOR A CASSETTE TAPE DECK

[75] Inventor: Young C. Kim, Nam Chang-Dong, Rep. of Korea

[73] Assignee: SamSung Electronics Co., Ltd., Suwon, Rep. of Korea

[21] Appl. No.: 399,884

[22] Filed: Aug. 29, 1989

[51] Int. Cl.$^5$ .............................. G11B 5/008
[52] U.S. Cl. .................. 360/96.5; 360/71; 242/199
[58] Field of Search ............ 360/96.5, 96.6, 93, 360/71; 242/199, 198

[56] References Cited

U.S. PATENT DOCUMENTS

| | | | |
|---|---|---|---|
| 4,308,562 | 12/1981 | Negishi | 360/71 |
| 4,628,382 | 12/1986 | Okumuru | 360/93 |
| 4,685,009 | 8/1987 | Min et al. | 360/96.5 X |
| 4,752,048 | 6/1988 | Paik | 242/199 |
| 4,761,697 | 8/1988 | Hashiguchi et al. | 360/96.5 |

FOREIGN PATENT DOCUMENTS

| | | | |
|---|---|---|---|
| 59-151354 | 8/1984 | Japan | 360/96.5 |
| 63-253564 | 10/1988 | Japan | 360/96.5 |

Primary Examiner—John H. Wolff
Attorney, Agent, or Firm—Robert E. Bushnell

[57] ABSTRACT

A power transmitting apparatus utilizing a clutch in a magnetic recording/reproducing apparatus which simplifies the construction of a tape deck and loading unit by attaching an idle rotation device to the deck loading unit. The invention includes reducing gears, clutch members, clutch switching means, power transmitting device, wherein the power transmitting device is made to operate in cooperation with the cassette setting device. According to the invention, the power transmitting apparatus is more simple in structure but correct operation can be obtained and the reliability of the function of the product can be increased.

11 Claims, 3 Drawing Sheets

POWER TRANSMISSION AND CLUTCH MECHANISM FOR A CASSETTE TAPE DECK

BACKGROUND OF THE INVENTION

The present invention relates to a power transmitting apparatus utilizing a clutch capable of simplifying a tape deck and loading unit by providing an idler rotation unit for the deck and loading unit themselves in a magnetic recording/reproducing apparatus.

Generally, in a front loading system of magnetic recording/reproducing apparatus, when a cassette tape is pushed in through the front door, the cassette holder shaft slides along with the loading groove of a side wall sash of the housing and thereby the cassette switch is turned ON by the tape inserted in the holder and a loading motor is driven, and by the driving of this loading motor, side arms of arm gears move the shaft of the cassette holder horizontally and vertically, so that the loading of the deck is carried out.

That is to say, the driving power of the loading motor rotates the side bevel gear and timing gear through pulley, worm and worm gear, and driving the arm gear, delivering the cassette holder to the deck. However, since the loading motor rotates continuously even after the loading is completed, pin member protruded at the arm gear slides along the inclined surface of the timing gear, and releasing the arm gear and the timing gear, the torsion spring of the side arm is compressed and pushing continuously the cassette holder shaft, and the cassette tape is closely contacted to the deck, and thereby the side bevel gear of the housing and the timing gear idly rotate without fluctuation of the cassette tape.

According to the idler rotation unit of the housing utilized to the deck loading as aforementioned, since the structure of the housing is complicated and the production efficiency is very low due to the increase in the number of the parts there has been a problem of bad operation is frequently occurring in case when the idle rotation timing between the deck and the housing is not matched.

OBJECT AND SUMMARY OF THE INVENTION

Therefore, the present invention is contrived to solve these conventional problems, and it is an object of the present invention to provide a power transmitting apparatus capable of carrying out the loading operation and the idle operation of the deck and the loading unit itself by utilizing a clutch.

In order to attain this object, the present invention includes: reducing gears having a worm and master cam for transmitting the power of a loading motor rotating in normal or reverse direction; a clutch member having an idler gear and spring engaged with the gear and so as to move upward and downward along a shaft by a lever mechanism; a clutch switching device for coupling or releasing the idler gear and master cam by a lever mechanism in response to the cam curve of the master cam; a house for the power transmitting device in which the idler gear engaged with the master cam is released according to the operation of the clutch switching device so as the idle rotation is made at the master cam, at the same time, so as to be coupled with the housing mechanism by another worm connected to the idle gear; and wherein the housing power transmitting device is made to operate by coupling with the cassette setting device of the housing.

The forgoing and other objects as well as advantages of the present invention will become clear by following description of the invention with reference to the accompanying drawings.

BRIEF DESCRIPTION OF THE DRAWINGS

For a better understanding of the invention, and to show how the same may be carried into effect, reference will now be made, by way of example, with respect to the accompanying drawings, in which.

Throughout the drawings, like reference numerals and symbols are used for designating like or equivalent parts or portions, for simplicity of illustration and explanation.

DETAILED DESCRIPTION OF THE PREFERRED EMBODIMENT

Hereinafter, a preferred embodiment of the present invention will be described in detail with reference to the accompanying drawings.

Figure 1A:
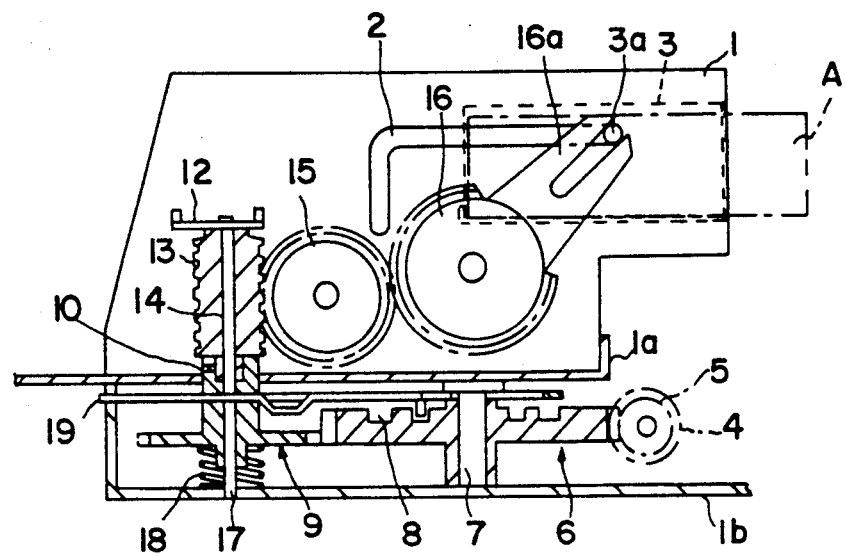
FIG. 1A is a cross sectional view taken along the side wall of the loading unit of a preferred embodiment of the present invention.
Figure 1B:
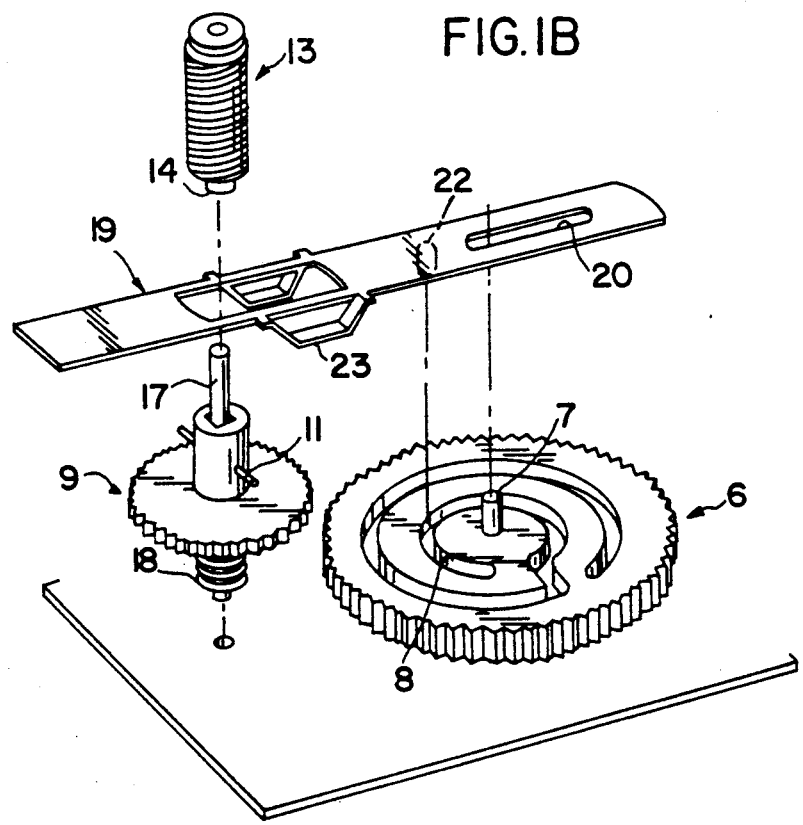
FIG. 1B is a fragmentary perspective view for showing the essential parts of the loading unit of a preferred embodiment of the present invention.

FIGS. 1A and 1B are respectively a cross sectional view and a fragmentary perspective view of the loading unit of the present invention, as shown in the drawings. A known cassette setting device in which a cassette tape A, inserted through the front door along side the loading groove 2 formed in the side sash 1 of the cassette housing, is firstly set in the cassette holder 3. The cassette holder shaft 3a moves slightly in the loading groove 2 by the tape inserting operation, at this moment, the top surface of the cassette causes the cassette switch (not shown) to be connected so that the arm gear 16 sets the cassette holder 3 to the deck by the loading motor 4. The warm 5 of the loading motor 4 includes the reducing gears engaged with the master cam 6 located below the supporting plate 1a of the housing.

The Master cam 6 is rotatably fixed by a stud 7 between the supporting plate 1a of the housing and the main deck 1b. Further, an idler gear 9 for the clutch operation is engaged with the master cam 6

The shaft 17 of the idler gear 9 is fixed with its one end to the main deck 1b under the supporting plate 1a and its other end is supported to the shaft fixing plate 12 of the side wall sash 1 through the supporting plate 1a, at the same time, another worm 13 is provided at the upper end of the shaft for the power transmission to the housing, and the worm 13 transmits the power to the housing gear 15 and the arm gear 16.

Rectangular protrusion 14 of the worm 13 is formed to be engaged with the rectangular groove 10 formed at the boss of the idler gear 9.

The idler gear 9 inserted to the lower end of the shaft 17 is provided with compression spring 18 resiliently so as to be able to move to upward and downward, and the. The sliding lever 19 having the elongated hole 20 and the guide groove 21 is inserted to the stud 7 of the master cam 6 and to the boss portion of the idler gear 9.

Accordingly, since the cam pin 22 of the sliding lever 19 is inserted in the helically curved cam groove 8 of the master cam 6, the sliding lever 19 moves to the right and left in response to the rotational movement of the master cam 6. The symmetrically formed protrusion portion 23 located at the intermediate position of the sliding lever 19 pushes the fixed pin 11. protruded at the boss portion of the idler gear 9 releasing the clutch connection between the idler gear 9 and the worm 13, so that the power of the loading motor starts to rotate in idle the master cam 6 and the idler gear 9.

Figure 2:
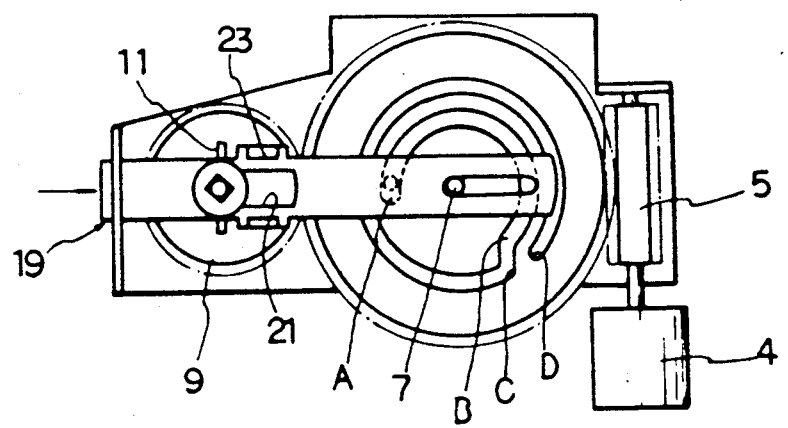
FIG. 2 is top view of the loading unit showing the clutch switching device of the present invention.

FIG. 2 shows the bottom of the loading unit before the driving of aforementioned loading motor 4.

The cam pin 22 of the sliding lever 19 is located at the A position of the helically curved cam groove 8 of the master cam 6 before the driving of the loading motor 4, and when the cassette is pushed in as in FIG. 1, the cassette switch becomes ON and the driving of the loading motor 4 becomes started.

At this moment, the master cam 6 engaged with the worm 5 of the loading motor is rotated counterclockwise, accordingly the cam pin 22 of the sliding lever 19 comes to the B position in response to the cam groove 8, the radius of curvature becoming gradually larger. The sliding lever 19 does not release the idle gear 9 and second worm 13 during the deck loading of the cassette holder, and then the idle rotation of the housing is carried out by the clutch releasing.

Figure 3:
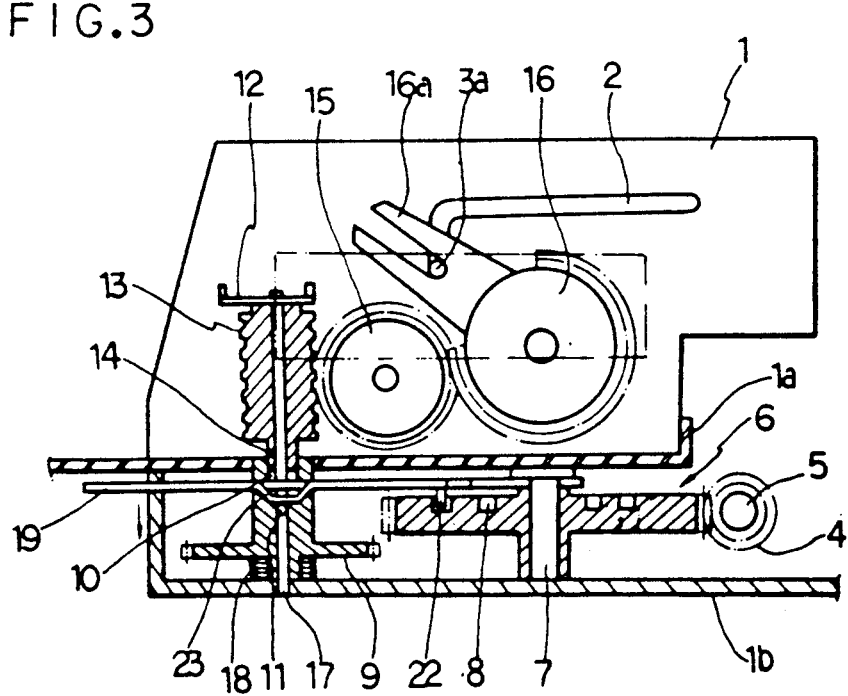
FIG. 3 is a fragmentary cross sectional view for showing the idle rotation after completing the loading of a cassette holder according to the present invention.

FIG. 3 shows the operation of the sliding lever 9 and the state that the arm gear 16 is driven.

That is to say, the master cam 6 and the idler gear 9 as well as the arm gear 16 engaged with the housing gear 15 through the worm 13 coupled by clutch with the idler gear 9 are driven by the driving of the loading motor 4, the side arm 16a moves the cassette holder shaft 3a to the end portion of the loading groove 2 and the setting of the cassette tape is carried out, within this state, as shown in FIG. 2, the cam pin 22 of the sliding lever 19 is moving between the B-C section that the radius of curvature being steeply changed, and the fixed pin 11 protruded correctly at the boss portion of the idle gear 9 is made to be located at the top position of the symmetrical protrusion portion 23 of the sliding lever 19, so that the idler gear 9 is pushed to the bottom end of the shaft 17 as shown in FIG. 3.

At the same time, as soon as the rectangular protrusion 14 of the worm 13 is pulled out, the idler gear 9 and the master cam 6 are released and the power becomes isolated, and the compression spring 18 of the lower side of idler gear 9 becomes compressed.

Figure 4:
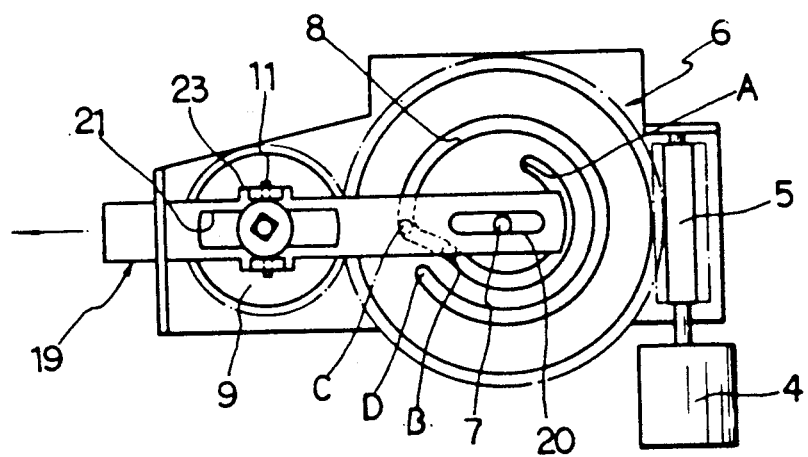
FIG. 4 is a schematic diagram for showing the clutch switching state according to FIG. 3.

FIG. 4 shows the idle rotation of the master cam after completing the cassette holder lowering operation.

That is to say, since the loading motor 4 is going to continue to rotate even though the setting of the cassette tape is finished, idle rotation of the master cam 6 released from the idler gear 9 is continued, and the cam pin 22 of the sliding lever 19 being to slide from C point to D point which are same in radius of curvature (at this moment, fall base of deck is loaded) and thereby the sliding lever 19 stops moving, and when the cam pin comes to the last D point (the fall base loading is completed), the loading motor is controlled by the program switch.

On the contrary, in case of ejecting, the loading motor is turned reversely and the master cam 6 engaged with the worm 5 of the motor side begins to rotate clockwise, the sliding lever 19 is not yet driven until the cam pin 22 of the sliding lever 19 coming from the D point to C point of the cam groove of the master cam (fall base unloading of the deck), at a moment passing from C point through B point of the cam groove 8, as shown in FIG. 3, the sliding lever is pulled to right side, so that the symmetrically formed protrusion portion 23 of the sliding lever 19 is released from the fixed pin 11 of the idler gear 9, and the idler gear 9 is lifted up along the shaft 17 by the resilient force of the compression spring 18 to thereby engage with the master cam 6.

Accordingly, the driving power of the loading motor being to drive the arm gear 16 through the master cam 6, idler gear 9, worm 13 and housing gear 15, the side arm 16a of the arm gear 16 pushes the cassette holder shaft 3a and moving vertically along with the loading groove 2, at the same time, the cam pin 22 of the sliding plate 19 is located at the A point of the cam groove 8 of the master cam 6 as before, to thereby become the state as in FIG. 2.

According to the above described embodiment, the present invention has the advantage that conventional idle rotation between the timing gear and arm gear of the housing is eliminated, and constituting the operation of mutual idle rotation to be obtained at the deck, so that the correct operation can be obtained.

It will be appreciated that the present invention is not restricted to the particular embodiment that has been described herein before, and that variations and modifications may be made therein without departing from the spirit and scope of the invention as defined in the appended claims and equivalents thereof.

What is claimed is:

1. A power transmitting apparatus in a magnetic recording/reproducing apparatus, comprising:
    reducing gears having:
        a first worm engaged with a reversible loading motor; and
        a master cam, engaged with said first worm, for transmitting the power of the loading motor;
    a clutch member having:
        an idler gear mounted for movement along a shaft; and
        a compression spring for biasing said idler gear into engagement with said master cam;
    switching means for releasing the idler gear, and master cam in response to the curvature of the cam curve of the master cam; and
    power transmitting means for coupling said idler gear with a cassette setting means 2. A power transmitting apparatus according to claim 1, wherein said switching means includes:
    a lever having a protrusion at a predetermined position to isolate said idler gear from said master cam and said transmitting means by moving said idler gear along said shaft against said bias and
    a cam pin attached to said lever for engaging a section of the master cam.

3. A power transmitting apparatus according to claim 1, wherein said idler gear includes a rectangular groove for engagement with a rectangular protrusion of said transmitting means.

4. A power transmitting apparatus comprising:
    a loading motor having a first worm;
    master cam means, engaged with said first worm of said loading motor, for transmitting power from said loading motor;
    an idler gear coupled to said master cam means;

a shaft for mounting said idler gear;
a second worm, having a rectangular protrusion, engaged with a rectangular groove in said idler gear;
a sliding lever, comprising:
   a cam pin portion, inserted in a helically curved cam groove in said master cam means; and
   a symmetrically formed protrusion portion for pushing a fixed pin protruding from a boss portion of said idler gear to release a clutch connection between the idler gear and said second worm, allowing the loading motor to rotate the master cam means without driving said second worm;
a cassette holder; and
operative means for moving said cassette holder to a loaded position coupled to said second worm, and driven by said second worm to move the cassette holder.

5. A power transmitting apparatus comprising:
a loading motor;
a master cam driven by said motor;
an idler gear rotated by said master cam;
a worm gear connected to said idler gear;
an arm gear coupled to said worm gear through a housing gear, for moving a cassette holder shaft to the end of a loading groove to allow insertion of a cassette tape; and
clutch means for disengaging said master cam and said idler gear.

6. A power transmitting apparatus as claimed in claim 5, wherein said loading motor is connected to drive said master cam through a second worm gear.

7. A power transmitting apparatus as claimed in claim 5, wherein said arm gear allows for both horizontal and vertical movement of the shaft of the cassette holder to allow for proper loading of the cassette tape.

8. A power transmitting apparatus as claimed in claim 5, wherein said idler gear is biased by a compression spring to allow for movement of said idler gear along a shaft.

9. A power transmitting apparatus as claimed in claim 5, said clutch means further comprising:
a sliding lever, having:
   a cam pin portion, inserted in a helically curved cam groove in said master cam means; and
   a symmetrically formed protrusion portion for pushing said idler gear to release the idler gear from said worm gear.

10. A power transmitting apparatus as claimed in claim 9, wherein said sliding lever protrusion acts to release said master cam means from said idler gear.

11. A method for loading a deck, comprising the steps of:
inserting a cassette into the deck so as to turn ON a motor;
rotating a cam engaged by the motor;
moving a sliding lever, coupled to the cam;
rotating an idler gear;
rotating a worm engaged with the idler gear to drive an arm gear;
pushing a cassette holder shaft down by rotation of the arm gear allowing the cassette to be moved into a loading position; and
disengaging said idler gear from said cam.

* * * * *

UNITED STATES PATENT AND TRADEMARK OFFICE
CERTIFICATE OF CORRECTION

PATENT NO. : 5,038,237

DATED : August 6, 1991

INVENTOR(S) : Young-Chan KIM

It is certified that error appears in the above-identified patent and that said Letters Patent is hereby corrected as shown below:

| | | |
|---|---|---|
| Column 1, | Line 9, | delete "themselves"; |
| | Line 38, | insert --,-- after "parts"; |
| | Line 39, | delete "is", and change "case when" to --cases in which--; |
| | Line 55, | delete "and" (second occurrence); |
| | Line 60, | change "house" to --housing--; |
| Column 2, | Line 2, | change "by" to --in the--; |
| | Line 14, | change "," to --;--; |
| | Line 17, | change "," to --;--; |
| | Line 18, | insert --a-- after "is"; |
| | Line 19, | change "," to --;--; |
| | Line 22, | change "," to --;--; |
| | Line 48, | change "warm" to --worm--; |
| | Line 51, | delete "The"; |
| | Line 54, | insert --.-- after "6"; |
| | Line 55, | delete "its". |

UNITED STATES PATENT AND TRADEMARK OFFICE
CERTIFICATE OF CORRECTION

PATENT NO. : 5,038,237

DATED : August 6, 1991

INVENTOR(S) : Young-Chan KIM

It is certified that error appears in the above-identified patent and that said Letters Patent is hereby corrected as shown below:

Column 2, line 68, delete "to" (third occurrence), and delete "and";
         line 69, delete "the" (first occurrence).

Column 3, line 1, change "to" to --in--;
         line 2, change "to" to --in--;
         line 10, insert --,-- after "9";
         line 20, change "becomes" to --turns--;
         line 21, change "becomes started" to --starts--;
         line 28, delete "second";
         line 59, change "being' to --begins--;
         line 60, insert --the-- after "are".

Column 4, line 3, insert --6-- after "cam" (second occurrence);
         line 6, insert --the-- after "to";
         line 13, change "being" to --begins--;

Column 4, claim 1, line 46, delete ",";
                line 50, insert --.-- after "means".
         claim 2, line 56, insert --;-- after "bias".

Signed and Sealed this

Third Day of November, 1992

Attest:

DOUGLAS B. COMER

Attesting Officer      Acting Commissioner of Patents and Trademarks